US005501059A

United States Patent [19]
Weder et al.

[11] Patent Number: 5,501,059
[45] Date of Patent: Mar. 26, 1996

[54] DECORATIVE ASSEMBLY FOR A FLORAL GROUPING

[75] Inventors: Donald E. Weder, Highland; William F. Straeter, Breese, both of Ill.

[73] Assignee: Highland Supply Corporation, Highland, Ill.

[21] Appl. No.: 427,014

[22] Filed: Apr. 24, 1995

Related U.S. Application Data

[63] Continuation of Ser. No. 941,992, Sep. 8, 1992, Pat. No. 5,410,856, which is a continuation-in-part of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned, said Ser. No. 941,992, is a continuation-in-part of Ser. No. 934,832, Aug. 24, 1992, Pat. No. 5,426,914, which is a continuation-in-part of Ser. No. 819,311, Jan. 9, 1992, abandoned, which is a continuation of Ser. No. 765,416, Sep. 26, 1991, abandoned5,105,599, which is a continuation of Ser. No. 530,491, May 29, 1990, abandoned, said Ser. No. 941,992, is a continuation-in-part of Ser. No. 940,930, Sep. 4, 1992, Pat. No. 5,361,482, which is a continuation-in-part of Ser. No. 926,098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned.

[51] Int. Cl.$^6$ ............................. B65B 11/02; B65B 25/02
[52] U.S. Cl. ................................ 53/397; 53/219; 53/390; 53/461; 206/423
[58] Field of Search ............................ 53/399, 397, 219, 53/218, 390, 464, 461; 206/423; 47/72, 66, 84; D11/143

[56] References Cited

U.S. PATENT DOCUMENTS 1,206,708  11/1916  Hutchins ................................. 47/73 X (List continued on next page.)

FOREIGN PATENT DOCUMENTS

| 0163453 | 12/1985 | European Pat. Off. . | |
| 1084888 | 1/1955 | France | 47/72 |
| 1393725 | 2/1965 | France . | |
| 2036163 | 12/1970 | France | 47/34.11 |
| 2272914 | 12/1975 | France . | |
| 2619698 | 3/1989 | France . | |
| 2651663 | 3/1991 | France . | |
| 345464 | 12/1921 | Germany | 53/464 |
| 513971 | 12/1930 | Germany | 47/72 |
| 1166692 | 3/1964 | Germany | 229/87 P |
| 2948265 | 5/1981 | Germany . | |
| 560532 | 2/1975 | Switzerland | 206/423 |
| 15550 | of 1899 | United Kingdom | 206/423 |
| 28322 | of 1907 | United Kingdom | 47/72 |
| 1204647 | 9/1970 | United Kingdom | 47/84 |

OTHER PUBLICATIONS

Exhibit A—"Target Halloween Sales With Highlander", Brochure, Highland Supply Corporation, 1992.
Exhibit B—"Speed Sheets and Speed Rolls", Brochure, Highland Supply Corporation, 1991, 2 pages.
Exhibit C—"The Simple Solution For Those Peak Volume Periods", Brochure, Highland Supply Corporation, 1989, 6 pages.
Exhibit D—"Cellocoup—It's A Wrap", The John Henry Company, 1992, 4 pages.
Exhibit E—"A World Of Cut Flower And Pot Plant Packaging", Brochure, Klerk's Plastic Products Manufacturing, Inc., date unknown, 6 pages. Applicant admits that the products described in this brochure have been on sale at least more than one year prior to the filing of the present patent application.

*Primary Examiner*—James F. Coan
*Attorney, Agent, or Firm*—Dunlap & Codding

[57] ABSTRACT

A decorative assembly for a floral grouping comprising a floral holding material and a sheet of material. The floral holding material is constructed of a material capable of receiving a portion of a floral grouping and supporting the floral grouping. The sheet of material is extended about a portion of the floral holding material and a crimped portion is formed in the sheet of material with the crimped portion cooperating to hold the sheet of material about the floral holding material to provide a decorative covering.

34 Claims, 2 Drawing Sheets

U.S. PATENT DOCUMENTS

| | | | |
|---|---|---|---|
| 1,446,563 | 2/1923 | Hughes | 206/423 |
| 1,610,652 | 12/1926 | Bouchard . | |
| 1,697,751 | 1/1929 | Blake | 47/72 X |
| 1,964,887 | 7/1934 | Lovett, Jr. | 47/37 |
| 1,988,886 | 1/1935 | Wilson | 47/37 |
| 1,994,962 | 3/1935 | Rushfeldt | 47/37 |
| 2,079,116 | 5/1937 | Gardner | 53/397 X |
| 2,152,648 | 4/1939 | Jones | 47/34 |
| 2,209,778 | 7/1940 | Krasowski | 41/10 |
| 2,274,526 | 2/1942 | Bunn | 100/31 |
| 2,302,259 | 11/1942 | Rothfuss | 41/10 |
| 2,340,373 | 2/1944 | Gardner | 206/423 X |
| 2,514,038 | 7/1950 | Doolittle | 226/129 |
| 2,774,187 | 12/1956 | Smithers | 47/41 |
| 2,850,842 | 9/1958 | Eubank, Jr. | 47/58 |
| 2,989,828 | 6/1961 | Warp | 53/390 |
| 3,022,605 | 2/1962 | Reynolds | 47/58 |
| 3,073,062 | 1/1963 | Hoffman | 47/41 |
| 3,271,922 | 9/1966 | Wallerstein et al. | 53/3 |
| 3,316,675 | 5/1967 | Cartwright, Jr. | 47/37 |
| 3,376,666 | 9/1968 | Leonard | 47/41 |
| 3,431,706 | 3/1969 | Stuck | 53/390 |
| 3,531,910 | 10/1970 | Snead | 53/135 |
| 3,554,434 | 1/1971 | Anderson | 229/55 |
| 3,556,389 | 1/1971 | Gregoire | 206/423 |
| 3,748,781 | 7/1973 | Erling | 47/34.11 |
| 3,869,828 | 3/1975 | Matsumoto | 47/34.11 |
| 3,962,503 | 6/1976 | Crawford | 53/397 X |
| 4,006,561 | 2/1977 | Thoma et al. | 47/58 |
| 4,091,925 | 5/1978 | Griffo et al. | 206/423 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,300,312 | 11/1981 | Weder et al. | 47/72 |
| 4,333,267 | 6/1982 | Witte | 47/84 |
| 4,400,910 | 8/1983 | Koudstaal et al. | 47/84 |
| 4,413,725 | 11/1983 | Bruno et al. | 206/45.33 |
| 4,621,733 | 11/1986 | Harris | 206/423 |
| 4,646,470 | 3/1987 | Maggio | 47/76 |
| 4,733,521 | 3/1988 | Weder et al. | 53/580 |
| 4,773,182 | 9/1988 | Weder et al. | 47/72 |
| 4,801,014 | 1/1989 | Meadows | 206/423 |
| 4,835,834 | 6/1989 | Weder | 29/525 |
| 4,901,423 | 2/1990 | Weder | 29/432 |
| 4,941,572 | 7/1990 | Harris | 206/423 |
| 5,077,937 | 1/1992 | Weder et al. | 47/72 |
| 5,085,003 | 2/1992 | Garcia | 47/72 |
| 5,111,638 | 5/1992 | Weder | 53/397 |
| 5,120,382 | 6/1992 | Weder | 156/212 |
| 5,181,364 | 1/1993 | Weder | 53/397 |
| 5,199,242 | 4/1993 | Weder et al. | 53/397 |
| 5,228,234 | 7/1993 | de Klerk et al. | 47/47.01 |
| 5,231,794 | 8/1993 | Weder et al. | 47/72 |
| 5,235,782 | 8/1993 | Landau | 47/72 |
| 5,239,775 | 8/1993 | Landau | 47/72 |
| 5,361,482 | 11/1994 | Weder et al. | 53/397 X |
| 5,369,934 | 12/1994 | Weder | 53/399 X |

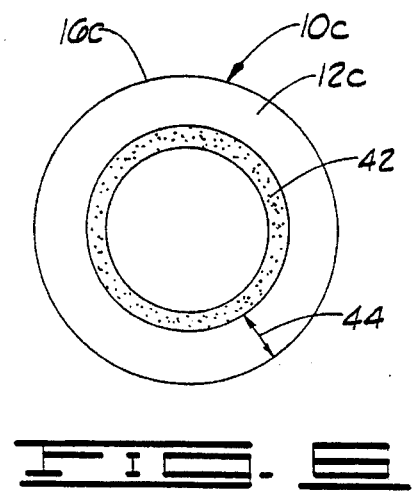
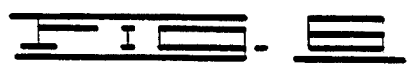
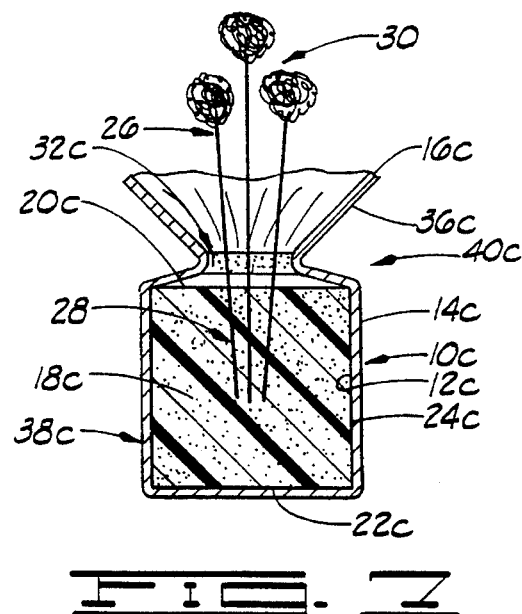
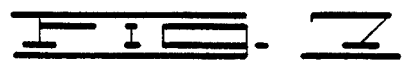
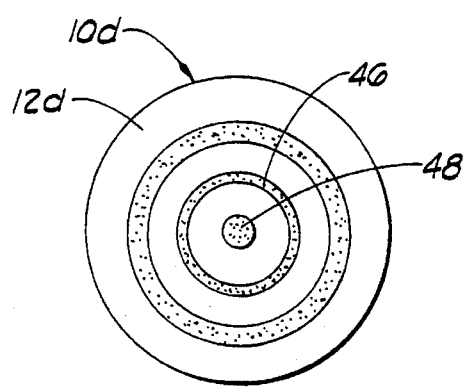
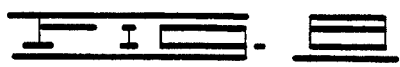
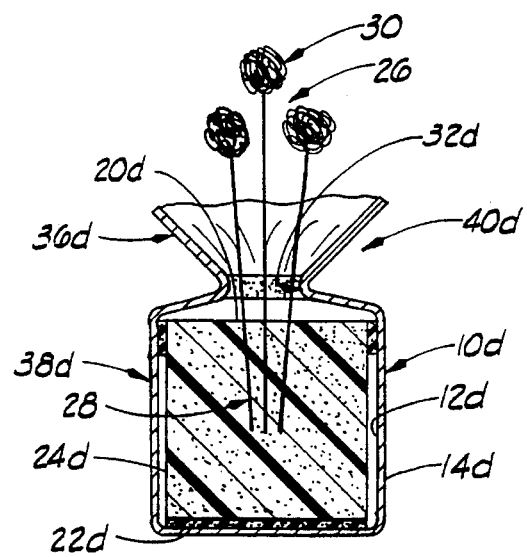
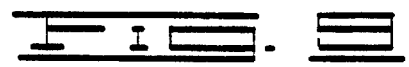

DECORATIVE ASSEMBLY FOR A FLORAL GROUPING

RELATED REFERENCES

This application is a continuation of U.S. Ser. No. 07/941,992, filed Sep. 8, 1992, entitled "Decorative Assembly For A Floral Grouping", now U.S. Pat. No. 5,410,856, which is a continuation-in-part of U.S. Ser. No. 07/893,586, filed Jun. 2, 1992, entitled "Wrapping A Floral Grouping With Sheets Having Adhesive or Cohesive Applied Thereto, now U.S. Pat. No. 5,181,364, which is a continuation of U.S. Ser. No. 07/707,417, filed May 28, 1991, entitled "Wrapping A Floral Grouping with Sheets Having Adhesive or Cohesive Material Applied Thereto, NOW ABANDONED, which is a continuation of U.S. Ser. No. 07/502,358, filed Mar. 29, 1990, entitled "Wrapping A Floral With Sheets Having Adhesive or Cohesive Material Applied Thereto, NOW ABANDONED, which is a continuation-in-part of U.S. Ser. No. 07/249,761, filed Sep. 26, 1988, entitled "Method For Wrapping An Object With A Material Having Pressure Sensitive Adhesive Thereon, NOW ABANDONED.

Said U.S. application Ser. No. 07/941,992 is also a continuation-in-part of U.S. Ser. No. 07/934,832, filed Aug. 24, 1992, entitled "Band Applicator For Applying A Band-About A Sheet Of Material And A Pot, now U.S. Pat. No. 5,426,914 which is a continuation-in-part of U.S. Ser. No. 07/819,311, filed Jan. 9, 1992, entitled "Means For Securing A Decorative Cover About A Flower Pot, NOW ABANDONED, which is a continuation of U.S. Ser. No. 07/765,416, filed Sep. 26, 1991, entitled Means For Securing A Decorative Cover About A Flower Pot, now U.S. Pat. No. 5,105,599 which is a continuation of U.S. Ser. No. 07/530,491, filed on May 29, 1990, entitled Means For Securing A Decorative Cover About A Flower Pot, now abandoned.

Said application Ser. No. 07/941,992 is also a continuation-in-part of U.S. Ser. No. 07/940,930, filed Sep. 4, 1992, entitled A Method of Forming A Flower Pot Cover With Crimped Portion, now U.S. Pat. No. 5,361,482, which is a continuation-in-part of U.S. Ser. No. 07/926,098, filed Aug. 5, 1992, entitled Method and Apparatus For Forming A Decorative Cover, which is a continuation-in-part of U.S. Ser. No. 07/803,318, filed Dec. 4, 1991, entitled "Wrapping Material For Wrapping A Floral Grouping Having Staggered Strips of Adhesive Material Applied Thereto, now U.S. Pat. No. 5,344,016 which is a continuation-in-part of U.S. Ser. No. 07/707,417, filed May 28, 1991, NOW ABANDONED.

FIELD OF THE INVENTION

The present invention relates generally to decorative assemblies for floral groupings and, more particularly, but not by way of limitation, to a decorative assembly for a floral grouping comprising a sheet of material disposed about a floral holding material with a crimped portion formed in the sheet of material for cooperating to hold the sheet of material in position about the floral holding material to provide a decorative covering.

BRIEF DESCRIPTION OF THE DRAWINGS

FIG. 6 is a plan view of a modified sheet of material.

FIG. 7 is a sectional view of a floral holding material with the sheet of material of FIG. 6 disposed about a portion of the floral holding material and a modified crimped portion being formed in a portion of the sheet of material.

FIG. 8 is a plan view of still another modified sheet of material.

FIG. 9 is a sectional view of a floral holding material showing the sheet of material of FIG. 8 disposed about a portion of the floral holding material with the crimped portion being formed in the sheet of material in a manner like that shown in FIG. 7.

DESCRIPTION OF THE PREFERRED EMBODIMENTS

Figure 1:
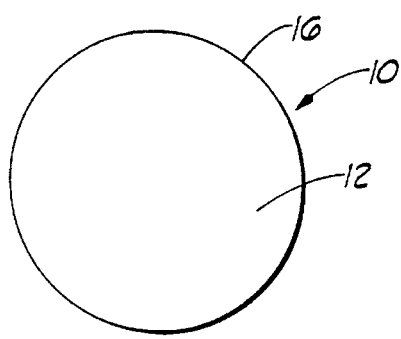
FIG. 1 is a plan view of a sheet of material constructed in accordance with the present invention.

Shown in FIG. 1 and designated by the general reference numeral 10 is a sheet of material constructed in accordance with the present invention. The sheet of material 10 has an upper surface 12 a lower surface 14 and an outer periphery 16.

The sheet of material 10 is constructed from any suitable flexible material that is capable of being wrapped or extended about a floral holding material 18 (FIG. 2) in the manner described below. Preferably, the sheet of material 10 is constructed of a material selected from a group of materials consisting of paper, metal foil, cloth (natural or synthetic or combinations thereof), denim, burlap, polymer film or cling material or combinations thereof.

The term "polymer film" as used herein means any polymer film. For example, but not by way of limitation, one polymer film is a polypropylene film. Another example of a polymer film, but not by way of limitation, is cellophane.

The sheet of material 10 has a thickness in a range from about 0.1 mils to about 30 mils. Preferably, the sheet of material 10 has a thickness in a range from about 0.1 mils to about 5 mils.

The sheet of material 10 may be any shape and a circular shape is shown in FIG. 1 only by way of example. The sheet of material 10 for example only may be square or rectangular or any other geometric shape such as heart shaped for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about the floral holding material 18, as described herein. Additionally, an insulating material such as bubble film, preferable as one of two or more layers, can be utilized in order to provide additional protection for the item wrapped therein. The layers of material comprising the sheet of material 10 may be connected together or laminated or may be separate layers.

A decorative pattern, such as a color and/or an embossed pattern, and/or other decorative surface ornamentation may be applied to the upper surface 12 and/or the lower surface 14 of the sheet of material 10 or portions thereof including, but not limited to printed design, coatings, colors, flocking or metallic finishes. The sheet of material 10 also may be totally or partially clear or tinted transparent material.

"Cling Wrap or Material" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material which remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

Figure 2:
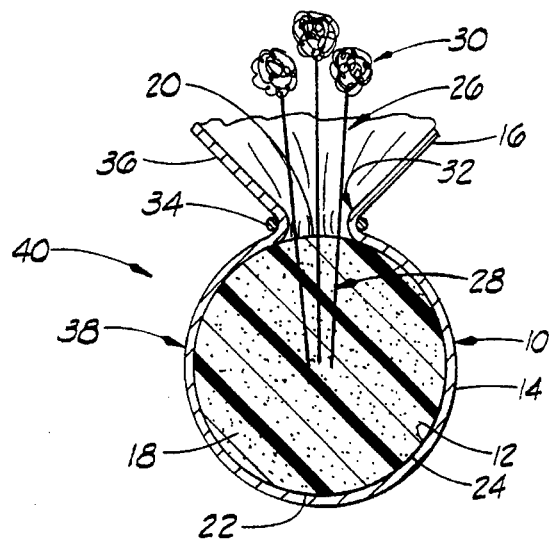
FIG. 2 is a sectional view showing the sheet of material extended about a portion of a floral holding material with a crimped portion being formed in the sheet of material for cooperating to hold the sheet of material in the position extended about the floral grouping to provide a decorative covering in accordance with the present invention.

As shown in FIG. 2, the floral holding material 18 has an upper end 20, a lower end 22 and an outer peripheral surface 24. The floral holding material 18 shown in FIG. 2 is spherically shaped, although the floral holding material 18 may be any shape desired in any particular application. The floral holding material 18 is constructed of a material capable of receiving a portion of a floral grouping 26 and holding or supporting the floral grouping without any pot means such as a separate flower pot for example.

The floral holding means 18 may be the type of material commonly referred to in the art as floral foam or Oasis™ or may be soil or artificial soil or other earth composition so long as the material is capable of holding its predetermined shape and capable of receiving and supporting the floral grouping 26 without any additional pot means. The floral holding material 18 may be capable of receiving and holding water for supplying water to the floral grouping 26.

As shown in FIG. 2, the floral grouping 26 has a stem end 28 and a bloom end 30. A portion of the stem end 28 of the floral grouping 26 is extended into the floral holding material 18. The bloom end 30 of the floral grouping 26 extends a distance above the floral holding material 18.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

As mentioned before, the floral holding material 18, as shown in FIG. 2, is generally spherically shaped. A flat portion (not shown) may be formed on the lower end 20 of the floral holding material 18 so that the floral holding material 18 may be supported more easily on a flat surface such as on a table (not shown) for example.

The sheet of material 10 is disposed adjacent the floral holding material 18 with the upper surface 12 of the sheet of material 10 being disposed adjacent the outer peripheral surface 24 of the floral holding material 18. In this position, as shown in FIG. 2, the sheet of material 10 is extended about and covers a substantial portion of the floral holding material 18 leaving the upper end 20 of the floral holding material 18 substantially uncovered so that the floral grouping 26 extends outwardly from the upper end 20 of the floral holding material 18.

In this position, a crimped portion 32 is formed in the sheet of material 10 near the upper end 20 of the floral holding material 18. The crimped portion 32 is formed by crimping together portions of the sheet of material to form the crimped portion 32. The crimped portion 32 extends a distance inwardly toward a central portion of the floral holding material 18. The crimped portion 32 preferably extends circumferentially about the upper end 20 of the floral holding material 18, although the crimped portion 32 could be formed only in portions of the sheet of material 18 thereby forming circumferentially spaced apart crimped portions if desired in a particular application.

As shown in FIG. 2, the crimped portion 32 is formed by placing a band 34 about a portion of the sheet of material 10 with the band 34 gathering or bringing together portions of the sheet of material 10 pulling portions of the sheet of material 10 toward a central portion of the upper end 20 of the floral holding material 18 to form the crimped portion 32.

The term "band" as used herein means any material which may be secured about an object such as the flower pot 16 such bands commonly being referred to as elastic bands or rubber bands and also includes any other type of material such as a string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material 10 to removably or substantially permanently form the crimped portion 32 and secure the crimped portion 32 formed in the sheet of material 10. The band 12 also may include a bow if desired in a particular application.

A portion of the sheet of material 10 near the outer periphery 16 thereof extends a distance above and beyond the crimped portion 32 to form a skirt 36 (FIG. 2) extending circumferentially about the upper end 20 of the floral holding material 18 and circumferentially about the floral grouping 26. The sheet of material 10 secured about the floral holding material 18 in the manner just described provides a decorative covering 38. The sheet of material 10 and the floral holding material 18 together with the means for forming the crimped portion 32 comprise a decorative assembly 40.

In one preferred embodiment, the band 12 is automatically placed about the sheet of material 10 using any one of a number of commercially available automatic or semi automatic banding machines such as the automatic shaping machine Model No. Power 260 available from Clements Industries, Inc., South Hackensack, N.J., or the machine Model No. Model BMNS Side Bender available from Saxmayer Corporation, Blissfield, Minn. (MN), for example.

In this last mentioned embodiment, the floral holding material 18 with the sheet of material 10 extended thereabout is placed in the banding machine and the banding machine is activated to automatically place the band 34 about the sheet of material 10.

A system for automatically placing a band about a sheet of material disposed about a flower pot is disclosed in co-pending application entitled "BAND APPLICATOR FOR APPLYING A BAND ABOUT A SHEET OF MATERIAL AND A POT" and assigned to the assignee of the present invention and one disclosure of the letters application specifically is incorporated herein by reference. This system can be utilized for automatically placing the band 34 about the sheet of material 10 in accordance with the present invention.

In one other embodiment, the sheet of material 10 is placed about the floral holding material 18 and then placed in a holding device of the type disclosed in copending patent application entitled "METHOD AND APPARATUS FOR WRAPPING A FLORAL GROUPING WITH WATER HOLDING AND RELEASING MATERIAL", and assigned to the assignee of the present invention, the disclosure of which specifically hereby is incorporated herein by reference. This device includes a band holder. After the floral holding material 18 with the sheet of material 10 extended thereabout is placed in the holding device, the operator then takes a band from the band holder and pulls it over the holding device and onto the sheet of material 10.

EMBODIMENT OF FIG. 3

Figure 3:
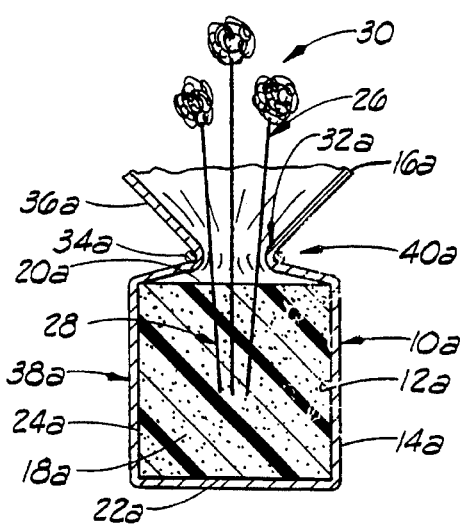
FIG. 3 is a sectional view of a modified floral holding material showing the sheet of material of FIG. 1 wrapped about the modified floral holding material to provide a decorative covering.

Shown in FIG. 3 is a modified decorative assembly 40a comprising the sheet of material 10a wrapped about a modified floral holding material 18a. The floral holding material 18a is constructed exactly like the floral holding material 18 shown in FIG. 2 and described in detail before, except the floral holding material 18a has a generally rectangularly shaped cross section as compared to the circular shaped cross section shown in FIG. 2 with respect to the floral holding material 18.

The sheet of material 10a is constructed exactly like the sheet of material 10 except the sheet of material 10a may be rectangularly shaped.

The sheet of material 10a is extended about the floral holding material 18a and the crimped portion 32a is formed in the sheet of material via the band 34a in a manner exactly like that described before in connection with the sheet of material and the floral holding material 18 shown in FIG. 2.

EMBODIMENT OF FIGS. 4 AND 5

Figure 4:
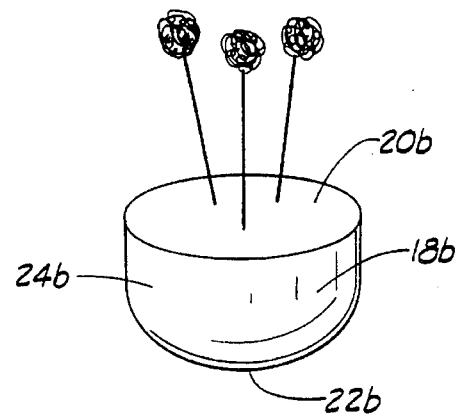
FIG. 4 is a perspective view of yet another modified floral holding material.

Shown in FIG. 4 is a modified floral holding material 18b which is constructed exactly like the floral holding material 18 shown in FIG. 2 and described in detail before, except the floral holding material 18b is in the shape of a solid basket.

Figure 5:
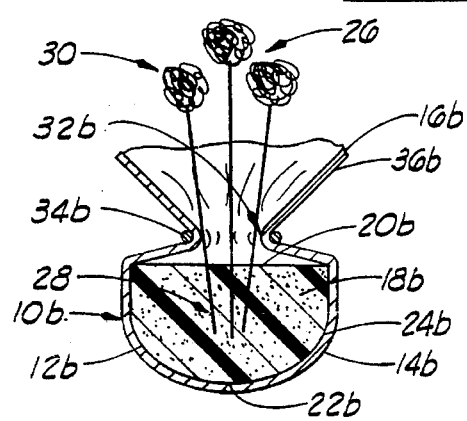
FIG. 5 is a sectional view of the modified floral holding material of FIG. 4 showing the sheet of material disposed about a portion of the modified floral holding material with the crimped portion being formed and a portion of the sheet of material.

Shown in FIG. 5 is a sheet of material 10b which is constructed exactly like the sheet of material 10 shown in FIG. 1 and described in detail before, except the sheet of material 10b is disposed or extended about the floral holding material 18b. A crimped portion 32b is formed in the sheet of material 10b via a band 34b for cooperating to hold the sheet of material 10b in position about the floral holding material 18b to provide the decorative covering 38b.

The decorative assembly 40b is constructed and operates exactly like the decorative assembly 40 shown in FIGS. 1 and 2 and described in detail before, except the sheet of material 10b is extended about the floral holding material 18b having a basket like shape as opposed to a spherical shape or rectangularly shaped cross section like the floral holding material 18 or 18a shown in FIGS. 2 and 3 respectively.

EMBODIMENT OF FIGS. 6 AND 7

Shown in FIG. 6 is a modified sheet of material 10c which is constructed exactly like the sheet of material 10 shown in FIG. 1 and described in detail before, except the sheet of material 10c has a closure bonding material 42 disposed thereon. More particularly, the closure bonding material 42 is disposed on the upper surface 12c of the sheet of material 10c and the closure bonding material 42 is spaced a distance 44 from the outer periphery 16c of the sheet of material 10c. The closure bonding material 42 extends circumferentially about the sheet of material 10c. The closure bonding material 42 is spaced a distance radially from a central portion of the sheet of material 10c. It should be noted that, although the closure bonding material 42 is shown in FIG. 6 in the form on a continuous strip of closure bonding material 42, the closure bonding material 42 may be in the form of spots or spaced apart strips and the spots or strips may be of any geometric shape desired in a particular application.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein.

Shown in FIG. 7 is a floral holding material 18c which is constructed exactly like the floral holding material 18a shown in FIG. 3 and described in detail before.

In operation, the sheet of material 10c is extended about a portion of the outer peripheral surface 24c of the floral holding material 18c. The crimped portion 42c is formed in the sheet of material 10c by crimping together portions of the sheet of material 10c near the closure bonding material 42 and forming overlapping portions of the sheet of material with the overlapping portions being substantially bonded via the closure bonding material 42 to form the crimped portion 32c. The crimped portion 32c will cooperate to hold the sheet of material 10c about the floral holding material 18c to provide the decorative covering 38c in a manner exactly like that described before with respect to the crimped portion 32 formed with the band 34 shown in FIG. 2, except in this instance the crimped portion 32 is formed by bringing together and bonding portions of the sheet of material 10c via the closure bonding material 42. The closure bonding material 42 is positioned on the upper surface 12c of the sheet of material 10c so that the crimped portion 32c is positioned above the upper end 20c of the floral holding material 18c, shown in FIG. 7.

The crimping of the sheet of material 10c may be accomplished by hand or with a machine or device.

EMBODIMENT OF FIGS. 8 AND 9

Shown in FIG. 8 is a modified sheet of material 10d which is constructed exactly like the sheet of material 10c shown in FIG. 6, except the sheet of material 10d also includes a first pot bonding material 46 which extends circumferentially about a portion of the sheet of material 10d. The first pot bonding material 46 is spaced a distance from the closure bonding material 42 and spaced a distance from a central portion of the sheet of material 10d. The sheet of material 10d also includes a second pot bonding material which is disposed on the upper surface 12d of the sheet of material 10d with the second pot bonding material 48 covering a central portion of the sheet of material 10d.

Shown in FIG. 9 is a sectional view of a floral holding material 18d which is constructed exactly like the floral holding material 18a shown in FIG. 3 and described in detail before. The sheet of material 10d is extended about the floral holding material 18d and the crimped portion 32d is formed in the sheet of material 10d in a manner exactly like that described before in connection with the sheet of material 10c shown in FIG. 7.

The first pot bonding material 46 is disposed on the sheet of material 10d and positioned thereon so that, when the sheet of material 10d is wrapped or extended about the floral holding material 18d, the first pot bonding material 46 is disposed adjacent a portion of the outer peripheral surface 24d near the upper end 20d of the floral holding material 18b. The portion of the sheet of material 10d with the pot bonding material 46 thereon is bondingly connected to the outer peripheral surface 24d of the floral holding material 18d for further cooperating to hold the sheet of material 10d extended about the floral holding material 18d. In addition, the second pot bonding material 48 is positioned on the sheet of material 10d so that the second pot bonding material 48 engages a portion of the lower end 22d of the floral holding material 18d and bondingly connected thereto for still further cooperating to hold the sheet of material 10d extended about the floral holding material 18d to form the decorative covering 38d.

The closure bonding material 42 and the pot bonding materials 46 and 48 may be disposed on the upper surface or the lower surface or both of the sheets of material 10 described herein or in any of the other positions described in the copending application entitled "METHOD AND APPARATUS FOR FORMING A DECORATIVE COVER" owned by the Assignee of the present invention, the disclosure of which specifically hereby is incorporated herein by reference.

The present invention particularly is useful for providing a decorative covering using a sheet of material constructed of a material which is non-shape sustaining. Non-shape sustaining means that the material may be shaped about the form of the floral holding material, but the sheet of material will not hold that shape and will relax back into substantially the non-formed shape unless held in the formed shaped by some means such as the forming of the crimped portion in the sheet of material. By comparison, a shape sustaining sheet of material would be a material such as a metal foil for example which may be formed about the floral holding material and which will substantially maintain the formed shape.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A decorative assembly for a floral grouping, comprising:

a floral holding material having an upper end, a lower end and an outer peripheral surface, the floral holding material being constructed of a material capable of receiving a portion of the floral grouping and supporting the floral grouping without any pot means;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material; and means for forming a crimped portion in a portion of the sheet of material with the crimped portion cooperating to hold the sheet of material in the position extended about the floral holding material to provide a decorative covering wherein the means for forming a crimped portion is used to form at least one overlapping fold in the sheet of material, which overlapping fold is substantially bonded via the means for forming the crimped portion and wherein the means for forming a crimped portion further comprises an adhesive or cohesive material.

2. The decorative assembly of claim 1 wherein the crimped portion is defined further as being disposed near the upper end of the floral holding material.

3. The decorative assembly of claim 1 wherein the crimped portion is defined further as being disposed above the upper end of the floral holding material.

4. The decorative assembly of claim 1 wherein the crimped portion is defined further as being disposed above the upper end of the floral holding material, with the crimped portion extending the distance radially inwardly toward a central portion of the floral holding material and the crimped portion extending circumferentially about the upper end of the floral holding material.

5. A method for providing a decorative covering comprising:

providing a floral holding material having an upper end, a lower end and an outer peripheral surface, the floral holding material being constructed of a material capable of receiving a portion of a floral grouping and supporting the floral grouping without any pot means, the floral grouping extending a distance from the upper end of the floral holding material;

providing a sheet of material having an upper surface, a lower surface and an outer periphery;

providing an adhesive or cohesive bonding material for bondingly engaging a portion of the sheet of material to the outer peripheral surface of the floral holding material for cooperating to hold the sheet of material in position extended about a portion of the outer peripheral surface of the floral holding material to form a decorative covering about the floral holding material;

extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material; and bonding engaging a portion of the sheet of material to the outer peripheral surface of the floral holding material via the adhesive or cohesive bonding material for cooperating to hold the sheet of material in a position extended about a portion of the outer peripheral surface of the floral holding material to form a decorative covering about the floral holding material.

6. The method of claim 5 comprising the additional step of crimping automatically a portion of the sheet of material to form a crimped portion in the sheet of material with the crimped portion cooperating to hold the sheet of material in the position extended about the floral holding material to provide the decorative covering.

7. A decorative assembly for a floral grouping, comprising:
   a floral holding material having an upper end, a lower end and an outer peripheral surface, the floral holding material being constructed of a material capable of receiving a portion of the floral grouping and supporting the floral grouping without any pot means;
   a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material;
   means for forming a crimped portion in the sheet of material with the crimped portion cooperating to hold the sheet of material in the position extended about the floral holding material to provide a decorative covering; and
   wherein the sheet of material further comprises a pot bonding material disposed on the portion thereof for bondingly engaging portions of the outer peripheral surface of the floral holding material for cooperating to hold the sheet of material in position extended about the outer peripheral surface of the floral holding material, the pot bonding material comprising an adhesive or cohesive material.

8. A method for providing a decorative covering comprising:
   providing a floral grouping having a bloom end and a stem end;
   providing a floral holding material having an upper end, a lower end and an outer peripheral surface, the floral holding material being constructed of a material capable of receiving a portion of the floral grouping and supporting the floral grouping without any pot means;
   providing a sheet of material having an upper surface a lower surface and an outer periphery the sheet of material with a pot bonding material being disposed thereon, the pot bonding material comprising an adhesive or cohesive material;
   disposing the stem end of the floral grouping in the floral holding material;
   disposing the upper surface of the sheet of material near the outer peripheral surface of the floral holding material and extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material with the pot bonding material bondingly engaging a portion of the floral holding material for bondingly connecting the sheet of material to the floral holding material; and
   crimping a portion of the sheet of material to form a crimped portion in the sheet of material with the crimped portion cooperating to hold the sheet of material in the position extended about the floral holding material to provide the decorative covering.

9. A method for providing a decorative covering, comprising:
   providing a floral grouping having a bloom end and a stem end;
   providing a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;
   providing a sheet of material having an upper surface, a lower surface and an outer periphery;
   providing means for forming a crimped portion in the sheet of material with the crimped portion cooperating to hold the sheet of material in the position extended about the floral holding material to provide a decorative covering and wherein the means for forming a crimped portion further comprises an adhesive or cohesive material;
   disposing the stem end of the floral grouping in the floral holding material;
   extending the sheet of material about the floral holding material with the upper surface of the sheet of material being disposed adjacent the outer peripheral surface of the floral holding material and the sheet of material covering a substantial portion of the outer peripheral surface of the floral holding material leaving a portion of the floral holding material near the upper end thereof uncovered whereby the floral grouping extends above the floral holding material and above the sheet of material a distance above the upper end of the floral holding material; and
   forming a crimped portion in the sheet of material near the upper end of the floral holding material with the crimped portion being engageable with a portion of the floral holding material for cooperating to hold the sheet of material in the position extended about the floral holding material to provide the decorative covering and wherein is formed at least one overlapping fold in the sheet of material, which overlapping fold is substantially bonded via the means for forming the crimped portion.

10. The method of claim 9 wherein the step of forming the crimped portion is defined further as forming the crimped portion near the upper end of the floral holding material.

11. The method of claim 9 wherein the step of forming the crimped portion is defined further as forming the crimped portion in the sheet of material at a position above the upper end of the floral holding material.

12. A method for providing a decorative covering, comprising:
   providing a floral grouping having a bloom end and a stem end;
   providing a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;

providing a sheet of material having an upper surface, a lower surface and an outer periphery the sheet of material with an adhesive or cohesive closure bonding material being disposed thereon;

disposing the stem end of the floral grouping in the floral holding material;

extending the sheet of material about the floral holding material with the upper surface of the sheet of material being disposed adjacent the outer peripheral surface of the floral holding material and the sheet of material covering a substantial portion of the outer peripheral surface of the floral holding material leaving a portion of the floral holding material near the upper end thereof uncovered whereby the floral grouping extends above the floral holding material and above the sheet of material a distance above the upper end of the floral holding material; and forming a crimped portion in the sheet of material near the upper end of the floral holding material with the crimped portion being engageable with a portion of the floral holding material for cooperating to hold the sheet of material in the position extended about the floral holding material to provide the decorative covering and wherein the step of forming the crimped portion further comprises:

crimping a portion of the sheet of material near the closure bonding material and forming overlapping portions of the sheet of material with the overlapping portions being substantially bonded via the closure bonding material to form the crimped portion.

13. A method for providing a decorative covering, comprising:

providing a floral grouping having a bloom end and a stem end;

providing a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;

providing a sheet of material having an upper surface, a lower surface and an outer periphery;

providing an adhesive or cohesive bonding material for bondingly engaging a portion of the sheet of material to the outer peripheral surface of the floral holding material for cooperating to hold the sheet of material in position extended about a portion of the outer peripheral surface of the floral holding material to form a decorative covering about the floral holding material;

disposing the stem end of the floral grouping in the floral holding material;

extending the sheet of material about the floral holding material with the upper surface of the sheet of material being disposed adjacent the outer peripheral surface of the floral holding material and the sheet of material covering a substantial portion of the outer peripheral surface of the floral holding material leaving a portion of the floral holding material near the upper end thereof uncovered whereby the floral grouping extends above the floral holding material and above the sheet of material a distance above the upper end of the floral holding material; and bondingly engaging a portion of the sheet of material to the outer peripheral surface of the floral holding material via the adhesive or cohesive bonding material for cooperating to hold the sheet of material in position extended about a portion of the outer peripheral surface of the floral holding material to form a decorative covering about the floral holding material.

14. The method of claim 13 comprising the additional step of forming a crimped portion in the sheet of material near the upper end of the floral holding material with the crimped portion being engageable with a portion of the floral holding material for cooperating to hold the sheet of material in the position extended about the floral holding material to provide the decorative covering.

15. A decorative assembly comprising:

a floral grouping having a bloom end and a stem end;

a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material, the sheet of material extending about the outer peripheral surface of the floral holding material and leaving uncovered a portion of the floral holding material near the upper end thereof uncovered whereby the floral grouping extends upwardly beyond the upper end of the floral holding material and above the sheet of material; and means for forming a crimped portion in the sheet of material with the crimped portion cooperating to hold the sheet of material in the position extended about the floral holding material to provide a decorative covering, the crimped portion being formed in the sheet of material near the upper end of the floral holding material wherein the means for forming a crimped portion is used to form at least one overlapping fold in the sheet of material, which overlapping fold is substantially bonded via the means for forming the crimped portion and wherein he means for forming a crimped portion further comprises an adhesive or cohesive material.

16. The decorative assembly of claim 15 wherein the crimped portion is defined further as being disposed near the upper end of the floral holding material.

17. The decorative assembly of claim 15 wherein the crimped portion is defined further as being disposed above the upper end of the floral holding material.

18. The decorative assembly of claim 15 wherein the crimped portion is defined further as being disposed above the upper end of the floral holding material, with the crimped portion extending the distance radially inwardly toward a central portion of the floral holding material and the crimped portion extending circumferentially about the upper end of the floral holding material.

19. A method for providing a decorative covering, comprising:

provoking a floral grouping having a bloom end and a stem end;

providing a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;

providing a sheet of material having an upper surface, a lower surface and an outer periphery, the sheet of material with a pot bonding material being disposed thereon, the pot bonding material comprising an adhesive or cohesive material;

disposing the stem end of the floral grouping in the floral holding material;

extending the sheet of material about the floral holding material with the upper surface of the sheet of material being disposed adjacent the outer peripheral surface of the floral holding material, with the pot bonding material bondingly engaging a portion of the floral holding material for bondingly connecting the sheet of material to the floral holding material and the sheet of material covering a substantial portion of the outer peripheral surface of the floral holding material leaving a portion of the floral holding material near the upper end thereof uncovered whereby the floral grouping extends above the floral holding material and above the sheet of material a distance above the upper end of the floral holding material; and forming a crimped portion in the sheet of material near the upper end of the floral holding material with the crimped portion being engageable with a portion of the floral holding material for cooperating to hold the sheet of material in the position extended about the floral holding material to provide the decorative covering.

20. A decorative assembly for a floral grouping comprising:

a floral holding material having an upper end, a lower end and an outer peripheral surface, the floral holding material being constructed of a material capable of receiving a portion of the floral grouping and supporting the floral grouping without any pot means;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material; and means for forming a crimped portion in the sheet of material with the crimped portion cooperating to hold the sheet of material in the position extended about the floral holding material to provide a decorative covering wherein the means for forming the crimped portion further comprises and adhesive or cohesive closure bonding material disposed on the sheet of material with the portions of the sheet of material near the closure bonding material being crimped together and forming overlapping portions being substantially bonded via the closure bonding material to form the crimped portion.

21. A decorative assembly for a floral grouping, comprising:

a floral holding material having an upper end, a lower end and an outer peripheral surface, the floral holding material being constructed of a material capable of receiving a portion of the floral grouping and supporting the floral grouping without any pot means;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material;

means for forming a crimped portion in the sheet of material with the crimped portion cooperating to hold the sheet of material in the position extended about the floral holding material to provide a decorative covering and wherein the means for forming a crimped portion further comprises an adhesive or cohesive material; and wherein the sheet of material further comprises a pot bonding material disposed on the portion thereof for bondingly engaging portions of the outer peripheral surface of the floral holding material for cooperating to hold the sheet of material in position extended about the outer peripheral surface of the floral holding material, the pot bonding material comprising an adhesive or cohesive material.

22. A decorative assembly for a floral grouping, comprising:

a floral holding material having an upper end, a lower end and an outer peripheral surface, the floral holding material being constructed of a material capable of receiving a portion of the floral grouping and supporting the floral grouping without any pot means;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material; and an adhesive or cohesive bonding material for bondingly engaging portions of the sheet of material to the outer peripheral surface of the floral holding material for cooperating to hold the sheet of material in position extended about a portion of the outer peripheral surface of the floral holding material to form a decorative covering about the floral holding material.

23. The decorative assembly of claim 22 wherein the adhesive or cohesive bonding material is disposed on at least a portion of the upper surface of the sheet of material for engaging portions of the outer peripheral surface of the floral holding material.

24. The decorative assembly of claim 22 wherein the adhesive or cohesive bonding material disposed on at least a portion of the outer peripheral surface of the floral holding material for bondingly connecting a portion of the sheet of material to the floral holding material.

25. The decorative assembly of claim 22 further comprising means for forming a crimped portion in the sheet of material with the crimped portion cooperating to hold the sheet of material in the position extended about the floral holding material to provide the decorative covering.

26. A decorative assembly comprising:

a floral grouping having a bloom end and a stem end;

a floral holding material having an upper end, a lower end and an outer peripheral surface, the floral holding material being constructed of a material capable of receiving a portion of the floral grouping and supporting the floral grouping without any pot means, the stem end of the floral grouping being disposed in the floral holding material and the floral holding material supporting the floral grouping with a portion of the floral grouping near the bloom end thereof extending a distance upwardly beyond the upper end of the floral holding material;

a sheet of material having an upper surface, a lower surface and an outer periphery, the upper surface of the sheet of material being disposed adjacent a portion of the outer peripheral surface of the floral holding material and the sheet of material extending about a portion of the outer peripheral surface of the floral holding material, the sheet of material extending about the outer peripheral surface of the floral holding material and leaving uncovered a portion of the floral holding material near the upper end thereof uncovered whereby the floral grouping extends upwardly beyond the upper end of the floral holding material and above the sheet of material; and an adhesive or cohesive bonding material for bondingly engaging a portion of the sheet of material to the outer peripheral surface of the floral holding material for cooperating to hold the sheet of material in position extended about a portion of the outer peripheral surface of the floral holding material to form a decorative covering about the floral holding material.

27. The decorative assembly of claim 26 further comprising:

means for forming a crimped portion in the sheet of material with the crimped portion cooperating to hold the sheet of material in the position extended about the floral holding material, the crimped portion being formed in the sheet of material near the upper end of the floral holding material and the crimped portion engaging a portion of the floral holding material for cooperating to hold the sheet of material in the position extended about the floral holding material.

28. A method for providing a decorative covering comprising:

providing a floral holding material having an upper end, a lower end and an outer peripheral surface, the floral holding material being constructed of a material capable of receiving a portion of a floral grouping and supporting the floral grouping without any pot means, the floral grouping extending a distance from the upper end of the floral holding material;

providing a sheet of material having an upper surface, a lower surface and an outer periphery;

providing means for forming a crimped portion in the sheet of material with the crimped portion cooperating to hold the sheet of material in the position extended about the floral holding material to provide a decorative covering and wherein the means for forming a crimped portion further comprises an adhesive or cohesive material;

extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material; and crimping automatically a portion of the sheet of material to form a crimped portion in the sheet of material with the crimped portion cooperating to hold the sheet of material in the position extended about the floral holding material to provide the decorative covering and wherein is formed at least one overlapping fold in the sheet of material, which overlapping fold is substantially bonded via the means for forming the crimped portion.

29. A method for providing a decorative covering comprising:

providing a floral grouping having a bloom end and a stem end;

providing a floral holding material having an upper end, a lower end and an outer peripheral surface, the floral holding material being constructed of a material capable of receiving a portion of the floral grouping and supporting the floral grouping without any pot means;

providing a sheet of material having an upper surface, a lower surface and an outer periphery;

disposing the stem end of the floral grouping in the floral holding material;

providing means for forming a crimped portion in the sheet of material with the crimped portion cooperating to hold the sheet of material in the position extended about the floral holding material to provide a decorative covering and wherein the means for forming a crimped portion further comprises an adhesive or cohesive material;

disposing the upper surface of the sheet of material near the outer peripheral surface of the floral holding material and extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material; and crimping a portion of the sheet of material to form a crimped portion in the sheet of material with the crimped portion cooperating to hold the sheet of material in the position extended about the floral holding material to provide the decorative covering wherein is formed at least one overlapping fold in the sheet of material, which overlapping fold is substantially bonded via the means for forming the crimped portion.

30. The method of claim 29 wherein the step of forming the crimped portion is defined further as forming the crimped portion near the upper end of the floral holding material.

31. The method of claim 29 wherein the step of forming the crimped portion is defined further as forming the crimped portion in the sheet of material at a position above the upper end of the floral holding material.

32. A method for providing a decorative covering comprising:

providing a floral grouping having a bloom end and a stem end;

providing a floral holding material having an upper end, a lower end and an outer peripheral surface, the floral holding material being constructed of a material capable of receiving a portion of the floral grouping and supporting the floral grouping without any pot means;

providing a sheet of material having an upper surface, a lower surface and an outer periphery;

providing an adhesive or cohesive bonding material for bondingly engaging a portion of the sheet of material to the outer peripheral surface of the floral holding material for cooperating to hold the sheet of material in position extended about a portion of the outer peripheral surface of the floral holding material to form a decorative covering about the floral holding material;

disposing the stem end of the floral grouping in the floral holding material;

disposing the upper surface of the sheet of material near the outer peripheral surface of the floral holding material and extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material; and bondingly engaging a portion of the sheet of material to the outer peripheral surface of the floral holding material via the adhesive or cohesive bonding material for cooperating to hold the sheet of material in position extended about a portion of the outer peripheral surface of the floral holding material to form a decorative covering about the floral holding material.

33. The method of claim 32 comprising the additional step of crimping a portion of the sheet of material to form a crimped portion in the sheet of material to form a crimped portion in the sheet of material with the crimped portion cooperating to hold the sheet of material in the position extended about the floral holding material to provide the decorative covering.

34. A method for providing a decorative covering comprising:

providing a floral grouping having a bloom end and a stem end;

providing a floral holding material having an upper end, a lower end and an outer peripheral surface, the floral holding material being constructed of a material capable of receiving a portion of the floral grouping and supporting the floral grouping without any pot means;

providing a sheet of material having an upper surface, a lower surface and an outer periphery, the sheet of material with an adhesive or cohesive closure bonding material being disposed on a portion thereof;

disposing the stem end of the floral grouping in the floral holding material;

disposing the upper surface of the sheet of material near the outer peripheral surface of the floral holding material and extending the sheet of material about at least a portion of the outer peripheral surface of the floral holding material while leaving at least a portion of the upper end of the floral holding material uncovered, the upper surface of the sheet of material being disposed adjacent the outer peripheral surface of the floral holding material; and crimping a portion of the sheet of material to form a crimped portion in the sheet of material with the crimped portion cooperating to hold the sheet of material in the position extended about the floral holding material to provide the decorative covering and wherein the step of forming the crimped portion further comprises:

crimping a portion of the sheet of material near the closure bonding material and forming overlapping portions of the sheet of material with the overlapping portions being substantially bonded via the closure bonding material to form the crimped portion.

* * * * *

UNITED STATES PATENT AND TRADEMARK OFFICE
CERTIFICATE OF CORRECTION

PATENT NO. : 5,501,059  Page 1 of 4
DATED : March 26, 1996
INVENTOR(S) : Weder et al.

It is certified that error appears in the above-identified patent and that said Letters Patent is hereby corrected as shown below: On the title page: Item [56]

"Related U.S. Application Data", lines 11-12, please delete "abandoned5,105,599" and substitute therefor --Pat. No. 5,105,599--.

In the drawings, Figure 9, please insert drawing element numeral --18d-- as indicated below.

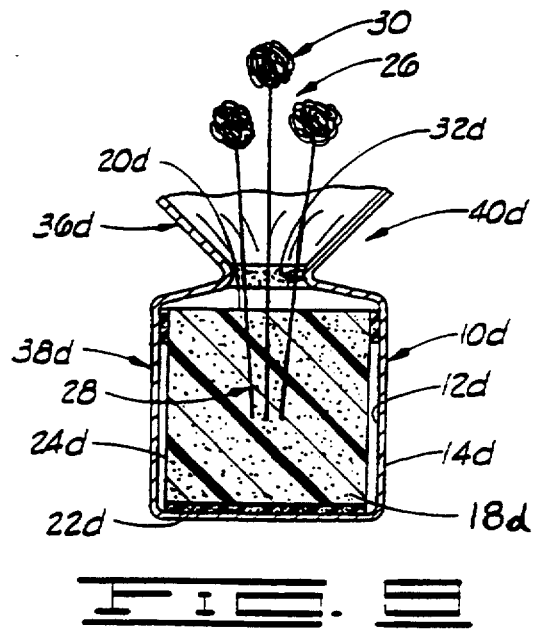

FIG. 9

UNITED STATES PATENT AND TRADEMARK OFFICE
CERTIFICATE OF CORRECTION

PATENT NO. : 5,501,059

DATED : March 26, 1996

INVENTOR(S) : Weder et al.

It is certified that error appears in the above-identified patent and that said Letters Patent is hereby corrected as shown below:

Column 1, line 17, after "Floral" please insert --Grouping--.

Column 2, line 13, please delete "and" and substitute therefor --in--.

Column 3, line 66, please delete "lower end 20" and substitute therefor --lower end 22--.

Column 4, line 22, please delete "sheet of material 18" and substitute therefor --sheet of material 10--.

Column 4, line 33, please delete "flower pot 16" and substitute therefor --sheet of material 10--.

Column 4, line 43, please delete "band 12" and substitute therefor --band 34--.

Column 4, line 56, please delete "band 12" and substitute therefor --band 34--.

Column 6, line 44, please delete "crimped portion 42c" and substitute therefor --crimped portion 32c--.

Column 6, line 55, please delete "crimped portion 32" and substitute therefor --crimped portion 32c--.

Column 7, lines 23-24, please delete "floral holding material 18b" and substitute therefor --floral holding material 18d--.

UNITED STATES PATENT AND TRADEMARK OFFICE
CERTIFICATE OF CORRECTION

PATENT NO. : 5,501,059

DATED : March 26, 1996

INVENTOR(S) : Weder et al.

It is certified that error appears in the above-identified patent and that said Letters Patent is hereby corrected as shown below:

Column 8, line 63, please delete "bonding" and substitute therefor --bondingly--.

Column 9, line 46, after "upper surface" please insert --,--.

Column 9, line 47, after "outer periphery" please insert --,--.

Column 11, line 8, after "outer periphery" please insert --,--.

Column 12, line 60, please delete "he" and substitute therefor --the--.

Column 14, line 3, please delete "and" and substitute therefor --an--.

Column 14, line 64, after "material" please insert --is--.

UNITED STATES PATENT AND TRADEMARK OFFICE
CERTIFICATE OF CORRECTION

PATENT NO. : 5,501,059
DATED : March 26, 1996
INVENTOR(S) : Weder, et al.

It is certified that error appears in the above-indentified patent and that said Letters Patent is hereby corrected as shown below:

Column 17, lines 34-35, please delete "to form a crimped portion in the sheet of material".

Signed and Sealed this

Twenty-third Day of July, 1996

Attest:

BRUCE LEHMAN

*Attesting Officer*    *Commissioner of Patents and Trademarks*